Nov. 2, 1926.
I. McK. BLOCH
1,605,209
INSTRUCTION ROLL
Filed June 3, 1922    3 Sheets-Sheet 1
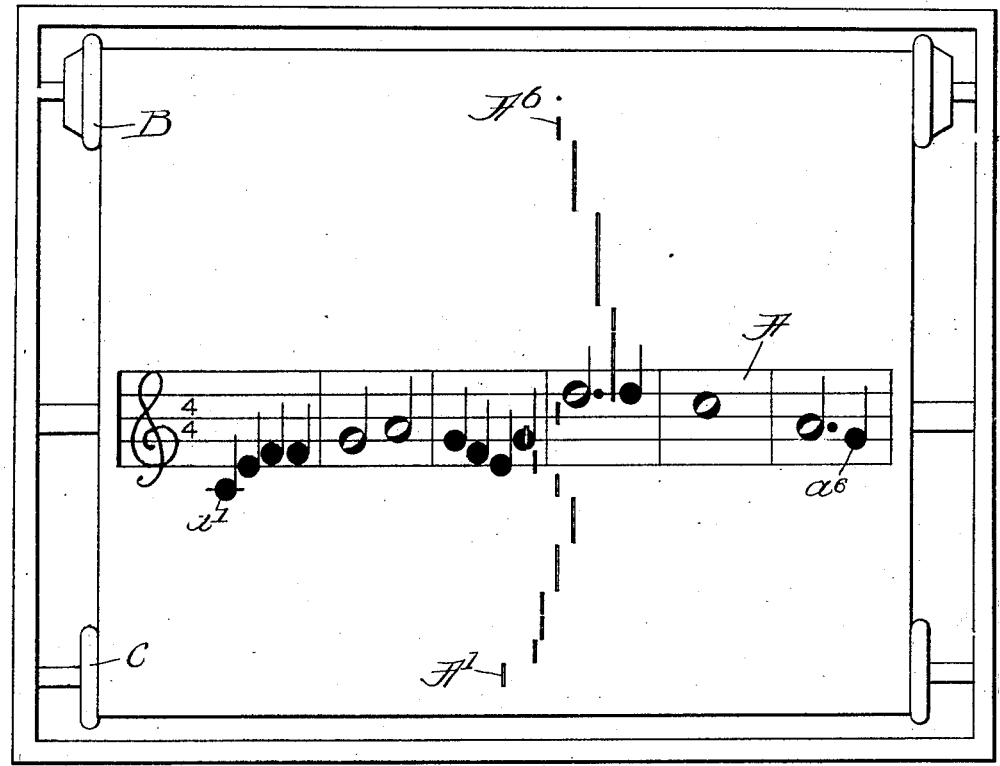

Nov. 2, 1926.

I. McK. BLOCH

INSTRUCTION ROLL

Filed June 3, 1922

Nov. 2, 1926.

I. McK. BLOCH 1,605,209

INSTRUCTION ROLL

Filed June 3, 1922   3 Sheets-Sheet 3

Inventor:
Isabelle McKee Bloch,
by Burton Burton
her Attys.

Witness:

Patented Nov. 2, 1926.

1,605,209

UNITED STATES PATENT OFFICE.

ISABELLE McKEE BLOCH, OF CHICAGO, ILLINOIS, ASSIGNOR TO THE Q R S MUSIC COMPANY, OF CHICAGO, ILLINOIS, A CORPORATION OF ILLINOIS.

INSTRUCTION ROLL.

Application filed June 3, 1922. Serial No. 565,692.

The purpose of this invention is to provide an improved form of perforated note sheet or music roll, so-called, for automatic players, adapted to be utilized in connection with the player mechanism for giving musical instruction. It consists in the superficial elements and features shown and described, comprising markings of staff notations printed upon and in certain relations to the perforated areas, all as indicated in the claims.

In the drawings:—

Figure 1 shows a portion of a perforated note sheet or music roll, presenting certain features of this invention.

Figure 2 is a further portion of the same roll which may be understood as following the portion shown in Figure 1, presenting another feature of the invention.

Figure 3 is a further portion of the same roll, presenting other features of the invention.

Figures 4, 5 and 6, show other portions of the same roll presenting other features of the invention.

Figure 6:
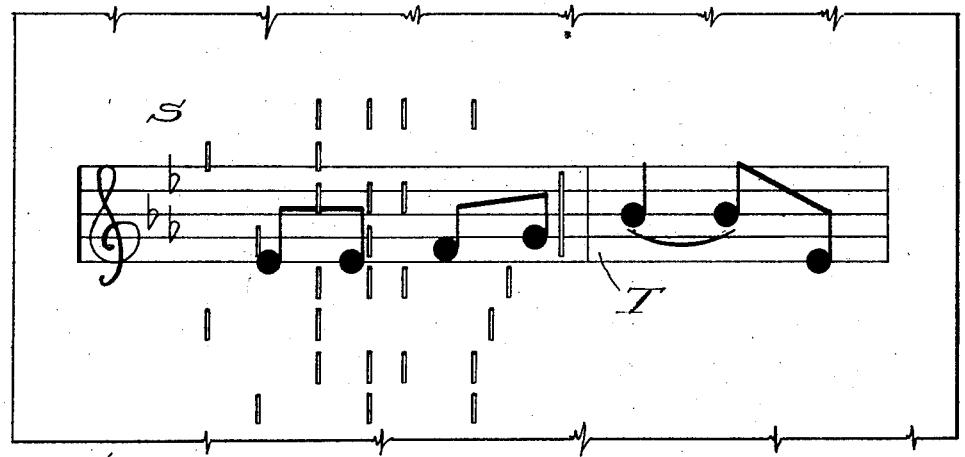

One characteristic feature of this invention is that the staff notation of the musical exercise or portion thereof which will be played by a given perforated area of the note sheet is in sight of the player while that perforated area is passing over the tracker; that is, while that portion of the exercise is being played automatically. A simple instance and illustration of this feature is seen in the portion of the music roll or note sheet represented in Figure 1, consisting of the staff notation, A, imprinted upon the note sheet, and which is represented as having just come over the upper roll, B, into view of the pupil, of which the first note, $a^1$, is being sounded by the slot, $A^1$, which is just passing onto the tracker. When the staff notation reaches the take-up roll, C, the slot, $A^6$, for the last indicated note, $a^6$, will be just passing the tracker, as indicated by the second imprint of the staff notation in this figure.

Another characteristic feature which may be employed concurrently with the first mentioned feature, is that when the bar of staff notation which is printed crosswise of the note sheet contains or may contain several times as many notes as can be represented by the slots in so much of the note sheet as can be in sight at one time, the bar of staff notation is represented in full at such intervals in the length of the perforated area concerned in playing the entire contents of said bar, that there shall always be in sight of the pupil at least one imprint of said staff notation; although the notes which have already been played before a given imprint comes into sight, or those which will not be played while that imprint is in sight, may be omitted from the imprint, or may be distinguished in character, as by color, from the notes which will be played while the particular imprint is passing in view.

A simple instance of this feature is contained in the portion of the note sheet or music roll which is represented in Figure 2, wherein the bar, E, of staff notation contains notes, $e^1$, $e^2$, $e^3$, $e^4$, $e^5$, $e^6$, $e^7$, $e^8$, etc., to $e^{18}$, all being whole notes so that the slots for any six notes occupy as much of the length of the note sheet as can be in sight at once, therefore requiring in accordance with this feature, three repetitions of the staff bar imprint in the length of the perforated area of the note sheet which contains the slots for all the notes on the staff bar. At the first imprint, the notes, $e^1$, etc., to $e^6$, are those which will be sounded by the slots, $E^1$, etc., to $E^6$, while the first imprint is in sight; and these three are printed normally, as in heavy black lines, while the remainder which will not be sounded while this imprint is in sight, may be distinguished by being printed in color, as may be understood from the light line showing of these other notes, $e^7$ to $e^{18}$, inclusive. Similarly at the second imprint, the notes $e^7$ to $e^{12}$, inclusive, which will be sounded while the second imprint of the staff passing in sight, are printed in heavy black, while the notes, $e^1$ to $e^6$, inclusive, which have previously been sounded, are printed in color, as may be understood by dotted line showing of these notes; and the three notes, $e^{13}$ to $e^{18}$, inclusive, which will not be sounded until the second imprint has passed out of sight, are shown in the first color, as indicated by light line, as in the first imprint.

A third feature which may also be employed concurrently,—that is, in the same part of the note sheet,—with the first feature, is, that a given musical exercise of which the staff notation is to be observed by the pupil, and which it is the purpose by means of this invention to cause the pupil to associate the pitch of each note with its representation as to position on the staff, is repeated in the cuttings of the note sheet so as to be played repeatedly as the note sheet traverses the tracker, the staff notation of the same being imprinted on each repeated perforated area. The method of use intended, is, that the player mechanism will be halted when the staff notation first appears in sight, and the pupil will read the staff notation before playing the exercise manually, without hearing it. Then the player will be started and the pupil will listen to the automatic playing while reading the staff notations at the second imprint. Then he will halt the player and while an imprint of the staff notation is still in sight, he will play it manually. And so, repeating and alternating the listening and the manual playing, the pitch of the notes will become fixed in mind in relation to and association with the staff notation of the same.

A simple instance of this feature is seen at a portion of the music roll presented in Figure 3, wherein at F there is shown a perforated area for playing a musical exercise of which the staff notation shown at $f$ is printed across the area F; the perforated area being duplicated at $F^1$, and at $F^2$, the staff notation being duplicated at $f^1$ on the area, $F^1$, and repeated for a third time at $f^2$ on the area, $F^2$.

A fourth characteristic of the invention is that in the case of staff notation of a selected exercise imprinted across the perforated area by which the same exercise is played automatically, the spacing of the notes on the staff, crosswise of the note sheet, corresponds to the length of the note, and thereby is proportional to the spacing of,— or distance allowed for,—corresponding slots lengthwise of the note sheet; so that the duration of notes or intervals between the notes may be impressed by eye, and not merely by the conventional form of the staff notes themselves. This feature is seen in each of the repetitions of the perforated areas and staff notations upon Figure 3.

A fifth specific form or feature of this invention with the specific purpose hereinafter indicated, is shown in Figure 4, consisting in that the staff bar composing both bass and treble clef, and thereon two concurrent lines of notes, $m$ and $n$, respectively, which may be taken as indicating any plurality of concurrent notations, as for example, a plurality of parts or a plurality of instruments. The first perforated area, M, contains the slots for one part or instrument expressed by notes, $m$, and the second perforated area, N, contains the slots for the other part or instrument expressed by the notes, $n$, and the third perforated area MN, contains the slots corresponding to those for either so both parts or instruments expressed by notes, $m^1$ and $n^1$, but cut one or more octaves above the staff notation. The purpose and utility of this repeated presentation on the music roll of the same composition or exercise is in part that the pupil is thereby accustomed to differentiating the lines or notes for different parts or instruments while both are presented to the eye, and to associate each with the proper pitch. A further purpose is that the pupil may play manually one part while being accompanied by the automatic playing of the other part; and in connection with this purpose the staff notation of the part which is to be played manually in each instance is distinguished by having imprinted on the staff notation adjacent to the respective notes numerals indicating the finger of the hand of the pupil to be used in striking the notes respectively. Thus while the perforated area, M, is passing over the tracker or in sight of the pupil, the pupil will play with the right hand the notes, $m$, of the treble part as imprinted upon the staff notation, the bass part being simultaneously played automatically by the perforations at this area. Then as area. N, comes into view and passes over the tracker, the pupil will play with the left hand the notes, $n$, of the bass part while the treble part will be played in accompaniment automatically by the slots in this area, N. When the third area, MN, is passing over the tracker, the pupil will use both hands, playing both parts according to the staff notation, being accompanied by the automatic playing of the same parts two octaves higher than the staff notation of the same. The specific advantage of having the perforations in area, MN, in octaves different from those indicated by the staff notation is that the keys depressed by the automatic playing are not those which the pupil is striking at the same time.

Figure 5:

Analogous to the fourth characteristic above mentioned is a sixth feature which is seen in Figure 5, consisting in that the extent longitudinally of the note sheet of the total area, R, occupied by the staff notation imprint is substantially that of the perforated area for playing the entire staff notation thus imprinted.

A seventh feature is shown in Figure 6, consisting in that upon the area, S, which has perforations for playing several parts or the parts for several instruments, as may be understood upon inspection of the slots in the area of said Figure 6, there is imprinted a bar of staff notation, T, of a solo part, as for a vocal or violin or other instrumental solo.

I claim:—

1. A sheet or web mounted and adapted for controlling the performance of an automatic musical instrument, having imprinted upon its perforate area which contains the perforations for playing a selected portion of the musical exercise or composition the staff notation of the same selection extending transversely of the direction of travel of the web, the spacing of the notes longitudinally of the staff corresponding to the lengths longitudinally of the web of the perforations for playing the same notes automatically.

2. A sheet or web mounted and adapted for controlling the performance of an automatic musical instrument, having imprinted upon its perforate area which contains the perforations for playing a selected portion of the musical exercise or composition the staff notation of the same selection extending transversely of the direction of travel of the web, the spacing of the notes longitudinally of the staff corresponding to the lengths longitudinally of the web of the perforations for playing the same notes automatically, the staff being printed across the web in such position relatively to the perforate area for containing the slots for playing the notes printed on the staff, that said printed staff shall come into sight in unwinding of the roll when the slot corresponding to the first staff note is at the tracker, and shall still remain in sight when the slot corresponding to the last staff note reaches the tracker.

3. In the construction defined in claim 1, foregoing, the staff imprint being located along the length of the web at a position intermediate certain two note-controlling slots of the web which are both visible at the same time, said two slots corresponding to the first and last notes imprinted on the staff for reading.

4. An instruction roll for utilizing automatic playing devices for teaching manual playing, having perforate areas for automatic playing of a musical exercise, and having staff notation of the same exercise imprinted across said perforate areas repeatedly in the length of said area, whereby one of said staff notation imprints shall at all times during the automatic playing of the exercise be in sight of the pupil.

5. An instruction roll for utilizing automatic playing devices for teaching manual playing having repeated successively in the length and direction of travel of the roll perforated areas for playing a selected musical exercise; and having imprinted across each of said areas a staff notation of the same exercise, said imprint across the first area being at the initial part thereof, and the imprint upon the succeeding areas being successively at more and more advanced portions thereof.

6. An instruction roll for teaching manual playing by the use of automatic playing devices, having perforate areas for playing musical exercises repeated in succession along the length of the roll and having imprinted across said perforate areas respectively staff notations of the exercise.

7. An instruction roll for utilizing automatic playing devices for teaching manual playing, having repeated successively in the length and direction of travel of the roll perforated areas for playing a selected musical exercise and having imprinted across said areas staff notation of the same exercise, the perforations at the successive perforated areas being for different parts or instruments, and the repeated staff notations on said respective areas being identical,—that is, without omission of the notes for any part or instrument.

8. In an instruction roll as defined in claim 7, foregoing, a succeeding repetition of the perforated area for playing the exercise having the perforations at a portion transversely of the roll or note sheet for playing in octaves different from those indicated by the staff notation.

9. A perforated note sheet for automatic players having imprinted upon the area which contains the perforations for playing a musical theme or phrase and extending transversely thereof a staff notation of music constituting a proper accompaniment of that to be produced by the perforations, the successive ends of the staff notation being positioned on the note sheet in the intervals of the width thereof in positions corresponding to the positions longitudinally of the sheet of the slots for concurrently sounded tones.

In testimony whereof, I have hereunto set my hand at Chicago, Illinois, this 31st day of May, 1922.

ISABELLE McKEE BLOCH.